(12) United States Patent
Antony

(10) Patent No.: US 10,474,484 B2
(45) Date of Patent: Nov. 12, 2019

(54) OFFLINE MANAGEMENT OF VIRTUALIZATION SOFTWARE INSTALLED ON A HOST COMPUTER

(71) Applicant: VMWARE, INC., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 536 days.

(21) Appl. No.: 14/737,519

(22) Filed: Jun. 12, 2015

(65) Prior Publication Data

US 2016/0283513 A1    Sep. 29, 2016

(30) Foreign Application Priority Data

Mar. 26, 2015    (IN) .......................... 1570/CHE/2015

(51) Int. Cl.
| | | |
|---|---|---|
| *G06F 16/00* | (2019.01) | |
| *G06F 9/455* | (2018.01) | |
| *G06F 8/61* | (2018.01) | |
| *G06F 8/71* | (2018.01) | |
| *G06F 16/188* | (2019.01) | |

(52) U.S. Cl.
CPC ............ *G06F 9/45545* (2013.01); *G06F 8/61* (2013.01); *G06F 8/71* (2013.01); *G06F 16/188* (2019.01); *G06F 2009/45595* (2013.01)

(58) Field of Classification Search
CPC .......... G06F 17/3048; G06F 17/30418; G06F 17/30424; G06F 17/30657; G06F 17/30929; G06F 9/45554; G06F 9/45545; G06F 8/61; G06F 8/71; G06F 17/30233; G06F 2009/45595; G06F 17/30094; G06F 17/30194; G06F 16/134; G06F 16/182; G06F 16/188
See application file for complete search history.

(56) References Cited

U.S. PATENT DOCUMENTS

| | | | | |
|---|---|---|---|---|
| 8,135,930 | B1 * | 3/2012 | Mattox | G06F 9/45558 711/100 |
| 8,910,156 | B1 * | 12/2014 | Kenchammana-Hosekote | G06F 9/45533 718/1 |
| 2006/0031529 | A1 * | 2/2006 | Keith, Jr. | H04L 67/1095 709/227 |
| 2007/0094270 | A1 * | 4/2007 | Gallino | G06F 9/50 |
| 2007/0234334 | A1 * | 10/2007 | Araujo, Jr. | G06F 9/45558 717/168 |
| 2009/0276772 | A1 * | 11/2009 | Garrett | G06F 9/455 718/1 |
| 2010/0287363 | A1 * | 11/2010 | Thorsen | G06F 21/575 713/2 |
| 2011/0023031 | A1 * | 1/2011 | Bonola | G06F 8/61 718/1 |
| 2013/0151681 | A1 * | 6/2013 | Dournov | G06F 8/656 709/223 |

(Continued)

*Primary Examiner* — Noosha Arjomandi
(74) *Attorney, Agent, or Firm* — Loza & Loza, LLP

(57) ABSTRACT

In an example, a method of managing virtualization software installed on a host computer includes connecting to a platform management system in the host computer while a hardware platform in the host computer is in a low-power state; and accessing files of the virtualization software on a storage device in the platform management system through a distributed file system service executing on a controller of the platform management system.

14 Claims, 4 Drawing Sheets

(56) References Cited

U.S. PATENT DOCUMENTS

| | | | |
|---|---|---|---|
| 2013/0204975 A1* | 8/2013 | Keith, Jr. | H04L 63/10 709/219 |
| 2013/0304903 A1* | 11/2013 | Mick | H04L 43/0817 709/224 |
| 2014/0109087 A1* | 4/2014 | Jujare | G06F 9/45558 718/1 |
| 2014/0137114 A1* | 5/2014 | Bolte | G06F 9/45558 718/1 |
| 2014/0280433 A1* | 9/2014 | Messerli | H04L 67/06 709/201 |
| 2015/0237132 A1* | 8/2015 | Antony | H04L 67/1095 709/224 |
| 2015/0324217 A1* | 11/2015 | Shilmover | G06F 9/45558 718/1 |
| 2015/0379038 A1* | 12/2015 | Nikolov | G06F 17/30191 707/622 |
| 2015/0381456 A1* | 12/2015 | He | H04L 43/0894 709/224 |
| 2016/0283281 A1* | 9/2016 | Antony | G06F 9/5055 |
| 2017/0070361 A1* | 3/2017 | Sundermeyer | H04L 12/2818 |

* cited by examiner

OFFLINE MANAGEMENT OF VIRTUALIZATION SOFTWARE INSTALLED ON A HOST COMPUTER

RELATED APPLICATIONS

Benefit is claimed under 35 U.S.C. 119(a)-(d) to Foreign application Serial No. 1570/CHE/2015 filed in India entitled "OFFLINE MANAGEMENT OF VIRTUALIZATION SOFTWARE INSTALLED ON A HOST COMPUTER", on Mar. 26, 2015, by VMware, Inc., which is herein incorporated, in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud, architecture software, Amazon EC2™ web service, and OpenStack™ open source cloud computing service. IaaS cloud service is a type of cloud service that provides access to physical and/or virtual resources of a virtualization platform in a cloud environment. The virtualization platform can include a large number of host servers each installed with virtualization software that support IaaS constructs, such as virtual machines, logical networks, and the like. At a given time, some host servers support active virtual machines (i.e., virtual machines that are executing), while other host servers do not have any active virtual machines. The host servers, including those without active virtual machines, are powered on most of the time to allow for management of virtualization software and associated virtual machines. Management tasks include configuring the virtualization software, provisioning new virtual machines, configuring existing virtual machines, and the like. Keeping a large number of host servers powered consumes a considerable amount of resources, including power, energy, datacenter (e.g., cooling, network, etc.), and like-type resources.

SUMMARY

One or more embodiments provide techniques for offline management of virtualization software installed on a host computer. In an embodiment, a method of managing virtualization software installed on a host computer includes connecting to a platform management system in the host computer while a hardware platform in the host computer is in a low-power state; and accessing files of the virtualization software on a storage device in the platform management system through a distributed file system service executing on a controller of the platform management system.

In another embodiment, a computer system includes a hardware platform including a central processing unit (CPU). The computer system further includes a platform management system including a controller and a storage device, the storage device storing virtualization software that, when executed by the CPU, virtualizes the hardware platform. The controller is configured to execute a distributed file system service to provide access to a file system of the virtualization software.

Further embodiments include a non-transitory computer-readable storage medium comprising instructions that cause a computer system to carry out the above method above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more embodiments provide techniques for offline management of virtualization software installed on a host computer. In an embodiment, files of the virtualization software are stored on storage of a platform management system in the host computer. The platform management system includes hardware, such as a baseboard management controller (BMC), and software configured to manage and monitor system hardware in the host computer. Notably, the platform management system is accessible by a client computing system even when host computer is in a low-power state (e.g., powered off). Storage in the platform management system can be used to host a hypervisor system image and/or virtual machine files of the virtualization software when the host computer is powered on, and allows the files to be accessible when the host computer is in a low-power state. Platform management system can include a distributed file system service configured to export the virtualization software files for access by client computing devices. In this manner, client applications can read files from, write files to, and modify files on, storage in the platform management system in order to perform various operations, such as modifying the configuration of virtualization software, modifying the configuration of virtual machines supported by the virtualization software, provisioning new virtual machine(s) to be supported by the virtualization software, and the like. Client applications can perform such operations even when the host computer is in a low-power state (e.g., powered off). As such, a cloud system or the like can keep host computers that are not actively being used in a low-power state, while maintaining the capability of managing virtualization software thereon.

Figure 1:
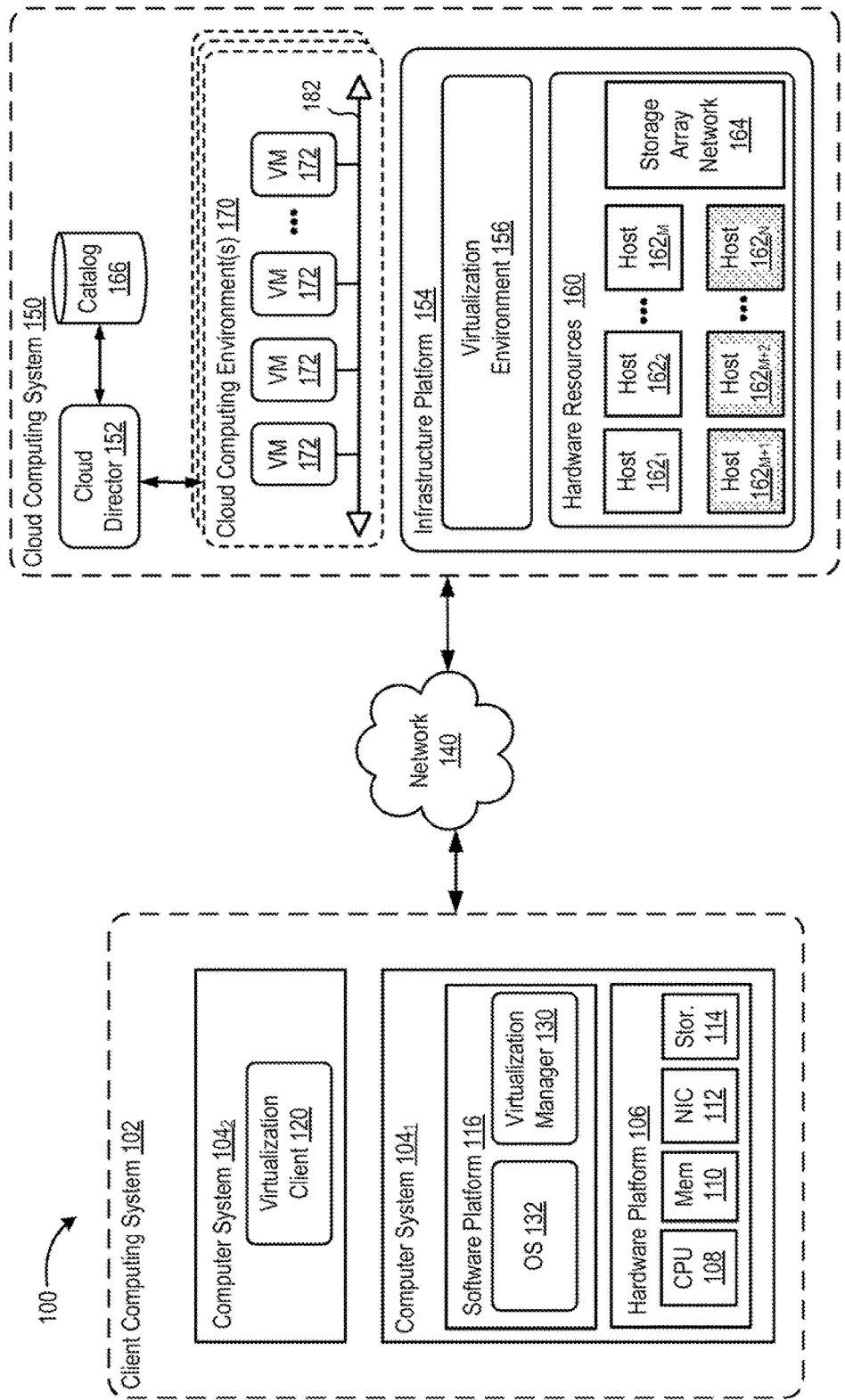
FIG. 1 is a block diagram of a computing system in which one or more embodiments of the present disclosure may be utilized.

FIG. 1 is a block diagram of a computing system 100 in which one or more embodiments of the present disclosure may be utilized. Computing system 100 includes a client computing system 102 and a cloud computing system 150. Client computing system 102 can communicate with cloud computing system 150 over a network 140. Client computing system 102 includes one or more computer systems 104 (e.g., two computer systems $104_1$ and $104_2$ are shown by example). Computer system $104_1$ can include a hardware platform 106, such as a server, a desktop, a laptop, a tablet, a handheld device, or the like. Hardware platform 106 can include conventional components of a computing device, such as one or more central processing units (CPUs) 108, system memory 110, a network interface 112, storage 114, and other input/output (IO) and support devices, such as a mouse, keyboard, and the like (not shown). Each of CPU(s)

108 is configured to execute instructions that perform one or more operations described herein. The instructions can be stored in system memory 110, storage 114, or any other memory in the hardware platform 106 (e.g., cache memory). System memory 110 includes device(s) that store information and can include, for example, random access memory (RAM), read-only memory (ROM), or a combination thereof. Network interface 112 can include one or more network adapters, as referred to as network interface cards (NICs). Storage 114 includes local storage devices, such as hard disks, flash memory modules, solid state disks, optical disks, and the like. Storage 114 can also include interface(s) configured for communication with one or more network data storage systems, such as host bus adapter(s) configured for communication with a storage array network (SAN) or network-attached storage (NAS), as well as other network data storage systems.

Computer system $104_1$ can include a software platform 116 that includes an operating system (OS) 132 and virtualization manager 130. Software platform 116 includes instructions that are executed by CPUs 108 to implement OS 132 and virtualization manager 130. Virtualization manager 130 is an application that executes within OS 132, which provides an interface to hardware platform 106. Virtualization manager 130 is configured to carry out various tasks to manage virtual computing resources provided by cloud computing system 150. One example of a virtualization manager that can be adapted according to embodiments described herein is the vCenter Server™ product made available from VMware, Inc. For example, virtualization manager 130 can deploy virtual machines (VMs) in cloud computing system 150 or perform other administrative tasks with respect to VMs in cloud computing system 150 using an application programming interface (API) published by cloud computing system 150, such as a representational state transfer (REST) API or any other client-server communication protocol. As described below, virtualization manager 130 can also directly access virtualization software on host computers of cloud computing system 150, including host computers that are powered off.

Each of computer systems 104 can be configured similar to computer system $104_1$. For clarity, the details of computer system $104_2$ are omitted from FIG. 1. Using hardware and software platforms similar to those in the computer system $104_1$, computer system 104 can execute a virtualization client 120. In an embodiment, virtualization client 120 can access virtualization manager 130 through network 140 and execute the functions of virtualization manager 130 described above. For example, virtualization client 120 can be a web client or the like that accesses a client interface of virtualization manager 130. In another embodiment, virtualization client 120 can directly access virtualization software on host computers of cloud computing system 150. For example, virtualization client 120 can be a client application that accesses a client interface of virtualization software on host computers in cloud computing system 150.

Cloud computing system 150 includes an infrastructure platform 154 upon which cloud computing environment(s) 170 can be executed. Cloud computing environment(s) 170 include a plurality of virtual machines 172 configured to host various applications. Cloud computing environment(s) 170 can also include other virtual resources, such as one or more virtual networks 182 used to communicate between VMs 172. Virtual machines 172 provide abstractions of processor, memory, storage, and networking resources. Virtual networks 182 provide abstractions of networks, such as local area networks (LANs), wide area networks (WANs), and the like. Infrastructure platform 154 includes hardware resources 160 and a virtualization environment 156. Hardware resources 160 include computing resources, storage resources, network resources, and the like. In the embodiment shown, hardware resources 160 include a plurality of host computers $162_1$ through $162_N$ (collectively host computers 162) and a storage array network (SAN) 164. Hardware resources 160 are configured in a manner to provide virtualization environment 156 that supports the execution of virtual machines 172 across host computers 162. Virtualization environment 156 can be implemented by running hypervisors on host computers 162, such as VMware ESX® based hypervisor technologies provided by VMware, Inc. of Palo Alto, Calif. (although it should be recognized that any other virtualization technologies, including Xen® and Microsoft Hyper-V® virtualization technologies may be utilized consistent with the teachings herein).

Cloud computing system 150 can also include a cloud director 152 that manages cloud computing environment(s) 170. Cloud director 152 can include an API through which a client application (e.g., virtualization manager 130) can invoke operations. Cloud director 152 maintains and publishes a catalog 166 of available virtual machine templates and packaged virtual machine applications that represent virtual machines that may be provisioned in cloud computing environment(s) 170. A virtual machine template is a virtual machine image that is loaded with a pre-installed guest operating system, applications, data, and is typically used to repeatedly create a VM having the pre-defined configuration. A packaged virtual machine application is a logical container of pre-configured virtual machine(s) having software components and parameters that define operational details of the packaged application. An example of packaged VM application is vAPP™ technology made available by VMware, Inc., of Palo Alto, Calif., although other technologies can be used.

At a given time, some host computers 162 are powered on while other host computers 162 are in a low-power state (e.g., powered off). For example, host computers that are not hosting active VMs can be put into a low-power state to conserve electricity and other resources in cloud computing system 150. As shown in FIG. 1, host computers $162_1$ through $162_M$ can be powered on, while host computers $162_{M+1}$ through $162_N$ can be in a low-power state (where M is positive integer less than N). In embodiments described herein, a client application (e.g., virtualization manager 130 or virtualization client 120) can access virtualization software on host computers 162 through platform management systems in the host computers 162. A platform management system is an autonomous computing subsystem in a host computer that provides management and monitoring capabilities independent from the host's CPU, firmware, and OS (sometimes referred to as "out-of-band management"). In some embodiments, a platform management system is a subsystem having its own processor, memory, network connection, and access to the system bus of the host. Notably, a platform management system is operable even when a host computer is in a low-power state. As such, a client application can access virtualization software through platform management systems of host computers 162 regardless of whether they are powered on or in a low-power state. Thus, host computers 162 can be kept in a low-power state (e.g., powered off) in order to conserve resources (e.g., power resources, network resources, computing resources, etc.).

Figure 2:
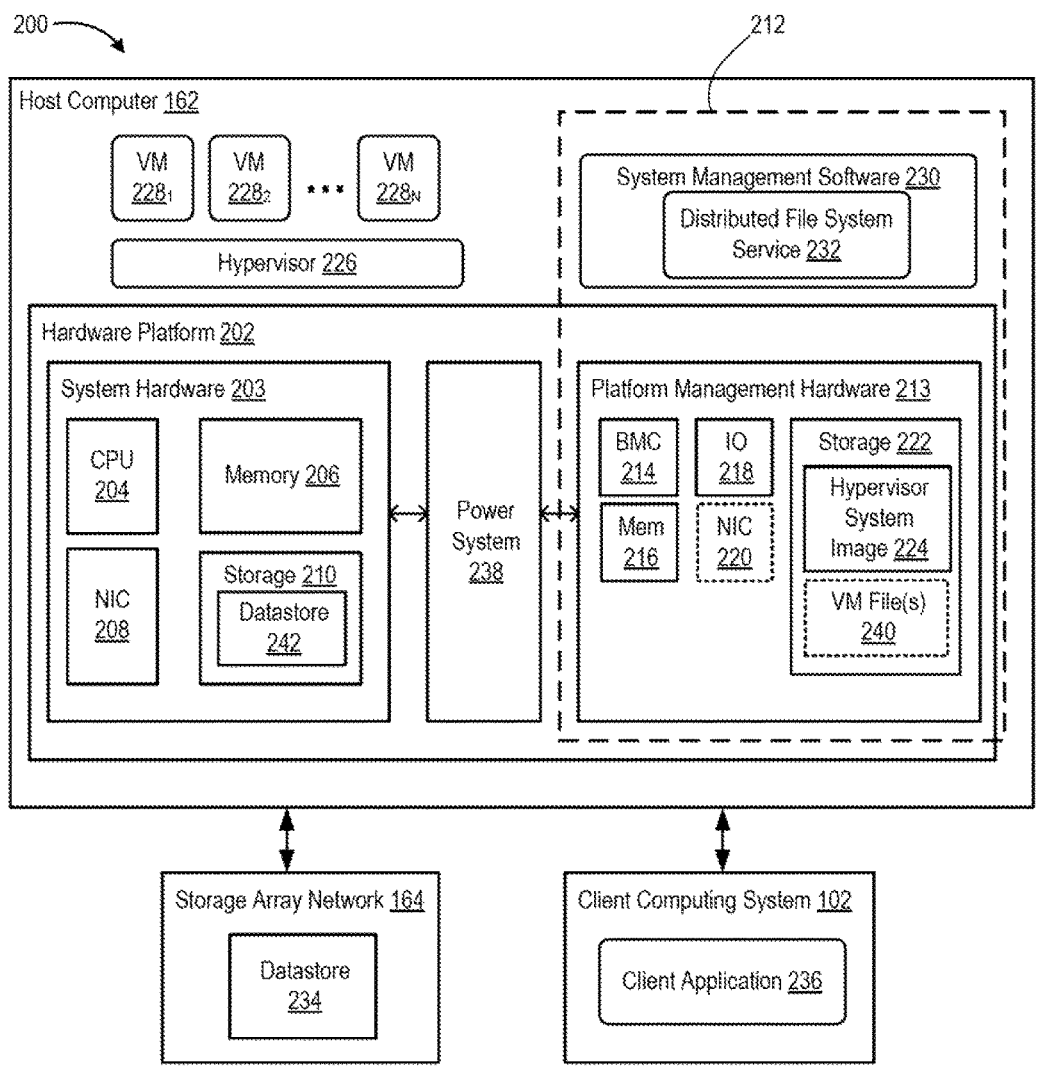
FIG. 2 is a block diagram showing an example of a computer system.

FIG. 2 is a block diagram showing an example of a computer system 200. In an embodiment, computer system 200 can be a subset of the computing system 100 shown in FIG. 1 and includes a host computer 162, the SAN 164, and a client computing system 102. Host computer 162 includes a hardware platform 202. While computer system 200 is described with respect to components in computing system 100, computer system 200 can be employed as a stand-alone system or employed in other computing systems.

Hardware platform 202 includes system hardware 203 comprising conventional components of a computing device, such as one or more CPUs 204, system memory 206, a network interface 208, storage 210, and other input/output (IO) and support devices (not shown). CPUs 204 can include one or more microprocessors known in the art. System memory 206 includes device(s) that store information and can include, for example, RAM, ROM, or a combination thereof. Network interface 208 can include one or more network adapters (e.g., NICs). Storage 210 includes local storage devices, such as hard disks, flash memory modules, solid state disks, optical disks, and the like. Storage 210 can also include interface(s) configured for communication with one or more network data storage systems, such as host bus adapter(s) configured for communication with SAN 164 or other type of data storage system (e.g., NAS). Hardware platform 202 includes a power system 238 configured to supply power to the system hardware 203.

Hardware platform 202 also includes platform management hardware 213 of a platform management system 212 configured to manage and monitor system hardware 203. Platform management hardware 213 comprises a baseboard management controller (BMC) 214, memory 216, IO interfaces 218, and storage 222. In some embodiments, platform management hardware 213 can include its own network interface 220 (e.g., NIC). Alternatively, platform management hardware 213 can access network interface 208 using IO interfaces 218 and network interface 220 can be omitted. BMC 214 can include a microcontroller, microprocessor, or the like, or a plurality of such devices. Memory 216 can include RAM, ROM, or a combination thereof. IO interfaces 218 can include interfaces to various types of busses, such as an I2C bus, a system management bus (SMBus), a low-pin count (ITC) bus, an intelligent platform management interface (IPMI) bus, serial bus, or the like, or combinations thereof. Storage 222 can include various types of nonvolatile storage devices, such as any type of secure digital (SD) memory, SSD device, hard disc drive, or the like, as well as combinations thereof. Storage 222 can be accessible by system hardware 203 through 10 interfaces 218. For example, CPUs 204 can access files in storage 222 through IO interfaces 218. Platform management system 212 can be integrated as part of a mainboard of host computer 162 having the CPUs 204 can be a peripheral card installed on a mainboard of host computer 162 having the CPUs 204, or can be a combination thereof. Example platform management systems that can be adapted for use in embodiments described herein include a Dell® Remote Assistance Card (DRAC) available from Dell Inc. of Round Rock, Tex. and an Integrated Lights-Out (iLO) controller available from Hewlett-Packard Company of Palo Alto, Calif. Power system 238 is configured to supply power to platform management system 212.

Hardware platform 202 can have various power states, including a "powered on" state and one or more "low-power states." As used herein, the power state of hardware platform 202 corresponds to the power state of host computer 162. In the powered on state, the various devices and components of system hardware 203 are on and operating at full power. For example, CPU 204 is on and executing instructions; memory 206 is on, storing data, and processing read and write transactions; network interface 208 is on and communicating data; and storage 210 is on and processing read and write transactions. In the powered on state, system hardware 203 consumes main power supplied by power system 238. In the powered on state, hypervisor 226 executes on system hardware 203.

An example low-power state is the "powered off" state. In the powered off state, the various devices and components of system hardware 203 are off or only consuming low power. For example, CPU 204, memory 206, network interface 208, and storage 210 can each be off and consuming no power. In some cases, one or more devices or components in system hardware 203 can consume low power when system hardware 203 is powered off. For example, network interface 208 can consume low power when system hardware 203 is powered off (e.g., to support a wake-on-LAN feature). Thus, when hardware platform 202 is powered off, system hardware 203 can consume no power or only auxiliary power from power system 238. Hypervisor 226 cannot execute when hardware platform 202 is powered off.

In contrast to system hardware 203, platform management hardware 213 is on and operating at full power regardless of whether hardware platform 202 is powered on or in a low-power state (e.g., powered off). Thus, system management software 230 executes on platform management hardware 213 in both the powered on state and in any low-power state (e.g., powered off). In some embodiments, platform management hardware 213 can access some resources in system hardware 203 while hardware platform 202 is powered off (e.g., network interface 208). Platform management system 212 can be used to transition hardware platform 202 from one power state to another.

In an embodiment, hardware platform 202 can transition to one or more intermediate power states between the powered on state and the powered off state. That is, hardware platform 202 can have a plurality of low-power states (including the powered off state), each consuming a different amount of power. For example, hardware platform 202 can comply with the Advanced Configuration and Power Interface (ACPI) specification or the like known in the art. ACPI defines various global power states, device power states, and CPU power states. Global power states include G0/S0 (working), G1 (sleeping), G2/S5 (soft off), and G3 (mechanical off). The powered on state as defined herein encompasses the G0/S0 (working) ACPI state. The powered off state as defined herein encompasses the G2/S5 (soft off) and G3 (mechanical off) states. Notably, if the hardware platform 202 is in a "mechanical off" state, then platform management hardware 213 can include separate power source in power system 238 that can continue to supply power (e.g., a battery or other power supply that is not mechanically switched off). Other low-power states encompass the G1 (sleeping) states, such as S1 (power on suspend), S2 (CPU powered off), S3 (suspend to RAM), and S4 (hibernation). Notably, in any of the G1 (sleeping) states, hypervisor 226 cannot execute on system hardware 203, but system management software 230 continues to execute on platform management hardware 213.

Host computer 162 is configured to provide a virtualization layer that abstracts system hardware 203 into multiple VMs $228_1$ through $228_N$ (collectively VMs 228). VMs 228 run on top of a software interface layer, as a hypervisor 226, which enables sharing of the hardware resources of system hardware 203 among VMs 228. One example of hypervisor 226 that may be used in embodiments described herein is a VMware® ESXi™ hypervisor provided as part of the VMware® vSphere® solution made commercially available from VMware, Inc, although other hypervisors can also be used. Hypervisor 226 may run on top of an operating system (not shown) or directly on system hardware 203. Each VM 228 is implemented by a set of files, such as a VM configuration file, virtual disk file(s), log file(s), snapshot file(s), and the like ("VM files"). Storage 210 of system hardware 203 can store a datastore 242 having VM files for VMs 228. Alternative to, or in addition to datastore 242. SAN 164 can store a datastore 234 having VM files for VMs 228. Datastore 242 comprises a local datastore in host computer 162, whereas datastore 234 comprises a remote datastore in SAN 164 (which can also be a shared datastore shared among other host computers). In an embodiment, storage 222 in platform management hardware 213 can also store VM file(s) 240 for VMs 228. For example, VM file(s) 240 can include VM configuration files for VMs 228 (known as .vmx files in a VMware ESXi™ hypervisor implementation). A VM configuration file can be a text file that includes various defined parameters specifying behavior of the VM (e.g., the number of CPUs assigned, the amount of memory assigned, the guest OS deployed therein, etc.). VM file(s) 240 can also include files that are temporarily stored by storage 222 and that are subsequently moved to storage 210 and/or SAN 164 (e.g., after hardware platform 202 is powered on).

Platform management system 212 includes system management software 230 executing on platform management hardware 213. System management software 230 can include instructions executable by BMC 214. System management software 230 can perform various operations to manage and monitor system hardware 203 that are well known in the art. In an embodiment, system management software 230 also provides access to files implementing hypervisor 226, as described below.

In an embodiment, storage 222 of platform management hardware 213 stores a hypervisor system image 224 for hypervisor 226. Hypervisor system image 224 is a collection of persistent files used to implement hypervisor 226 arranged within a particular hierarchy. In an embodiment, hypervisor system image 224 is organized into plurality of logical storage units, such as partitions, volumes, or the like, on storage 222. Files of hypervisor system image 224 can be divided among the local storage units. One of the logical storage units can include configuration files for hypervisor 226 and VMs 228. Notably, when executing, hypervisor 226 can maintain a configuration state. The configuration state can include information related to hypervisor 226, such network address, hostname, and the like, as well as an inventory of VMs registered with hypervisor 226. The configuration state can also include information related to VMs 228, such as which VMs 228 belong to specific groups (e.g., clusters, resource groups, etc.), which VMs 228 are enabled for disaster recovery (DR), which VMs 228 are enabled for high-availability (HA), which VMs 228 are enabled for replication, and the like. Hypervisor 226 can save the configuration state in hypervisor system image 224 so that it persists when hypervisor 226 is shutdown or rebooted.

Another logical storage unit can include installation files for hypervisor 226 (e.g., kernel files, driver files, startup scripts, etc.). Still other logical storage units can include boot files, scratch files, and the like. Another logical storage unit can include VM file(s) 240. Distributed file system service 232 can export at least a portion of hypervisor system image 224. The exported portion can include logical storage unit(s) having the configuration files and/or installation files for hypervisor 226. Distributed file system service 232 can also export logical storage unit(s) having VM file(s) 240.

When hardware platform 202 is powered on, CPUs 204 in system hardware 203 can access hypervisor system image 224 to load and boot hypervisor 226. When system hardware platform 202 is in a low-power state (e.g., powered off), platform management system 212 provides access to hypervisor system image 224 and/or VM file(s) 240. System management software 230 can execute a distributed file system service 232 that exports at least a portion of hypervisor system image 224 and/or VM file(s) 240 for access by client computing system 102. In an embodiment, distributed file system service 232 comprises a network file system (NFS) service, but other types of file services may be used, such as server message block (SMB), common internet file system (CIFS), or the like. In an embodiment, distributed file system service 232 can receive connections from client computing system 102 over a network. Alternatively, distributed file system service 232 can receive connections from client computing system 102 over a direct connection to platform management hardware 213 (e.g. a serial connection). In either case, distributed file system service 232 can require credentials for authentication from client computing system 102 to allow access to hypervisor system image 224 and/or VM file(s) 240. In some embodiments, platform management system 212 can also provide access to hypervisor system image 224 and/or VM files 240 when hardware platform 202 is powered on and hypervisor 226 is executing. This provides an alternative channel for client computing system 102 to access configuration information of hypervisor 226 and/or VMs 228 in case primary channels are unavailable (e.g., network connection). For example, client computing system 102 can access log files to troubleshoot loss of the primary channel (e.g., loss of network connection).

Figure 3:
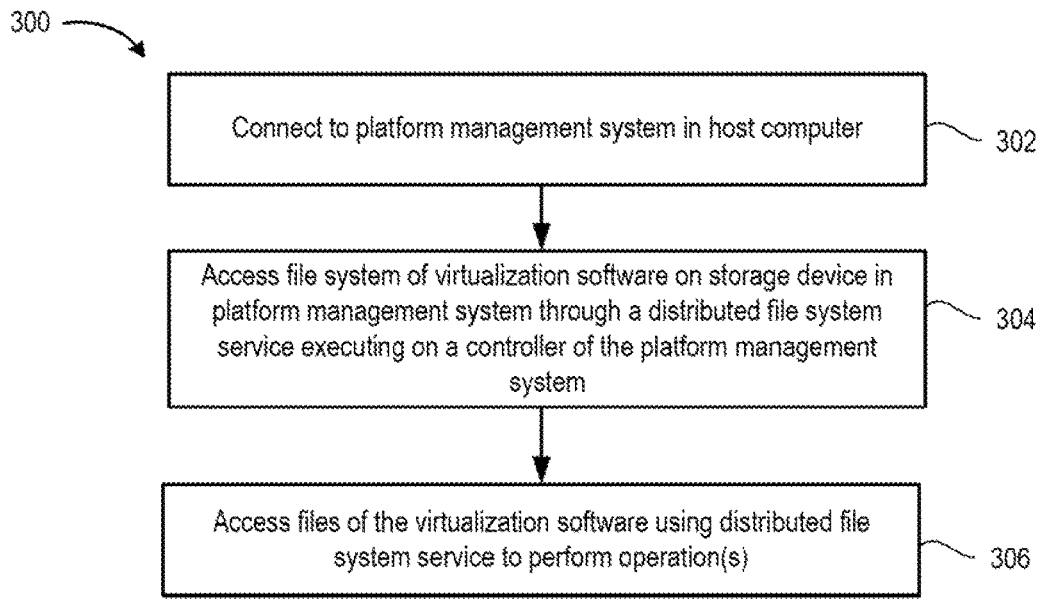
FIG. 3 is a flow diagram depicting a method of accessing virtualization software installed on a host computer according to an embodiment.

FIG. 3 is a flow diagram depicting a method 300 of accessing virtualization software installed on a host computer according to an embodiment. Method 300 can be performed by computer system 200 of FIG. 2 and is described with respect computer system 200. Method 300 begins at step 302, where client application 236 in client computing system 102 connects to platform management system 212 in host computer 162. For example, as described above, client application 236 can negotiate with distributed file system service 232 to gain access to platform management system 212. Alternatively, client application 236 can negotiate with some other service or module of system management software 230 to connect to platform management system 212. In an embodiment, host computer 162 is in a low-power state (e.g., powered off) when client application 236 connects to platform management system 212. In another embodiment, host computer 162 can be powered on when client application 236 connects to platform management system 212.

At step 304, client application 236 accesses hypervisor system image 224 and/or VM file(s) 240 (generally referred to as virtualization software) on storage 222 through distributed file system service 232. As described above, distributed file system service 232 can export logical storage unit(s) having portion(s) of hypervisor system image 224 and/or VM file(s) 240.

At step 306, client application 236 accesses files of hypervisor system image 224 and/or VM file(s) 240 through distributed file system service 232 to perform one or more operations. Various operations can be performed when client application 236 has access to hypervisor system image 224 and/or VM file(s) 240, examples of which are described below. The operations can be performed when platform management system 202 is in a low-power state or when platform management system 202 is powered on. Example operations include configuring hypervisor 226 and/or VMs 228 (discussed in FIG. 4 below) and provisioning new VMs (discussed in FIG. 5 below). Another example includes accessing logs or other types of data (e.g., reading from hypervisor system image 224 or VM file(s) 240) to obtain information.

Figure 4:
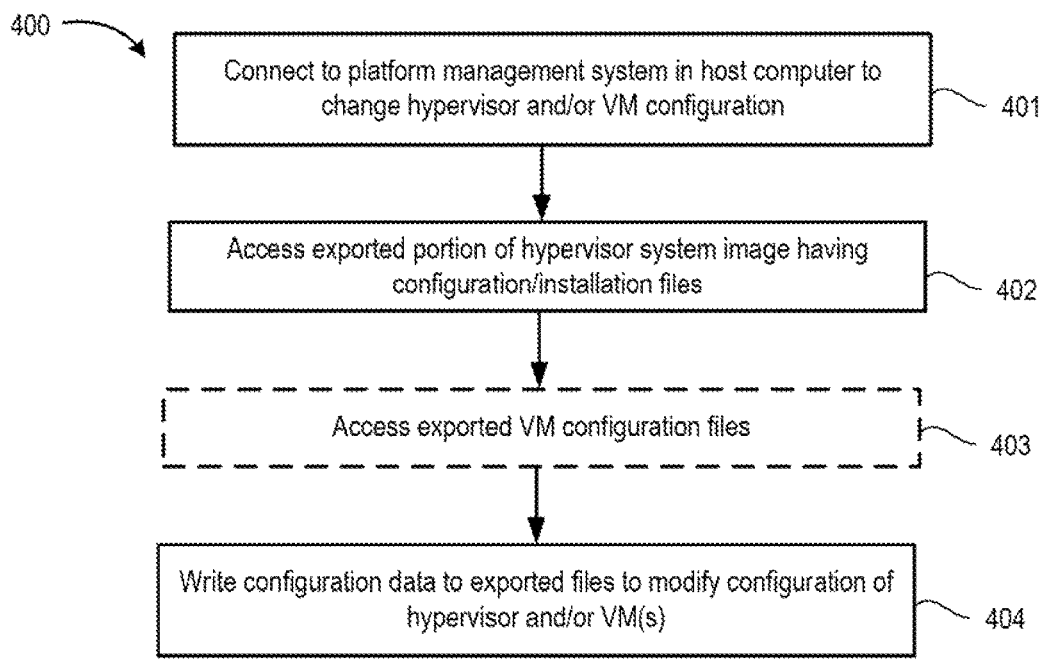
FIG. 4 is a flow diagram depicting a method of configuring virtualization software installed on a host computer according to an embodiment.

FIG. 4 is a flow diagram depicting a method 400 of configuring virtualization software installed on a host computer according to an embodiment. Configuring virtualization software is one example operation that can be performed when accessing the virtualization software through platform management system 212 as discussed above in FIG. 3. Method 400 can be performed by computer system 200 of FIG. 2 and is described with respect computer system 200. At step 401, client application 236 in client computing system 102 connects to platform management system 212 in host computer 162 for changing configuration of hypervisor 226 and/or VM(s) 228. For example, as described above, client application 236 can negotiate with distributed file system service 232 to gain access to platform management system 212. Alternatively, client application 236 can negotiate with some other service or module of system management software 230 to connect to platform management system 212. In an embodiment, host computer 162 is in a low-power state when client application 236 connects to platform management system 212 (i.e., i.e., hypervisor 226 is not executing).

At step 402, client application 236 accesses an exported portion of hypervisor system image 224 that includes configuration files and/or installation files of hypervisor 226 and VMs 228. At optional step 403, client application 236 accesses exported VM file(s) 240 that include VM configuration files for VMs. Optional step 403 can be performed if VM file(s) 240 are maintained in storage 222. At step 404, client application 236 writes configuration data to the exported files to modify configuration of hypervisor 226 and/or VM(s) 228. For example, client application 236 can modify and/or create configuration file(s), installation file(s), or both to change configuration of hypervisor 226, VM(s) 228, or both. Example configuration changes to hypervisor 226 include configuring a service of hypervisor 226 (e.g., configuring a secure shell service), enabling a feature of hypervisor 226 (e.g., enabling high-availability (HA)), installing, a service to hypervisor 226, configuring network settings, and the like. Example configuration changes to a VM include changes to virtual hardware settings (e.g., CPU, memory, storage, networking, and like type settings), modifying VM group membership (e.g., clusters resource groups, etc.), enabling features for VMs (e.g., HA, DR, replication, etc.).

Figure 5:
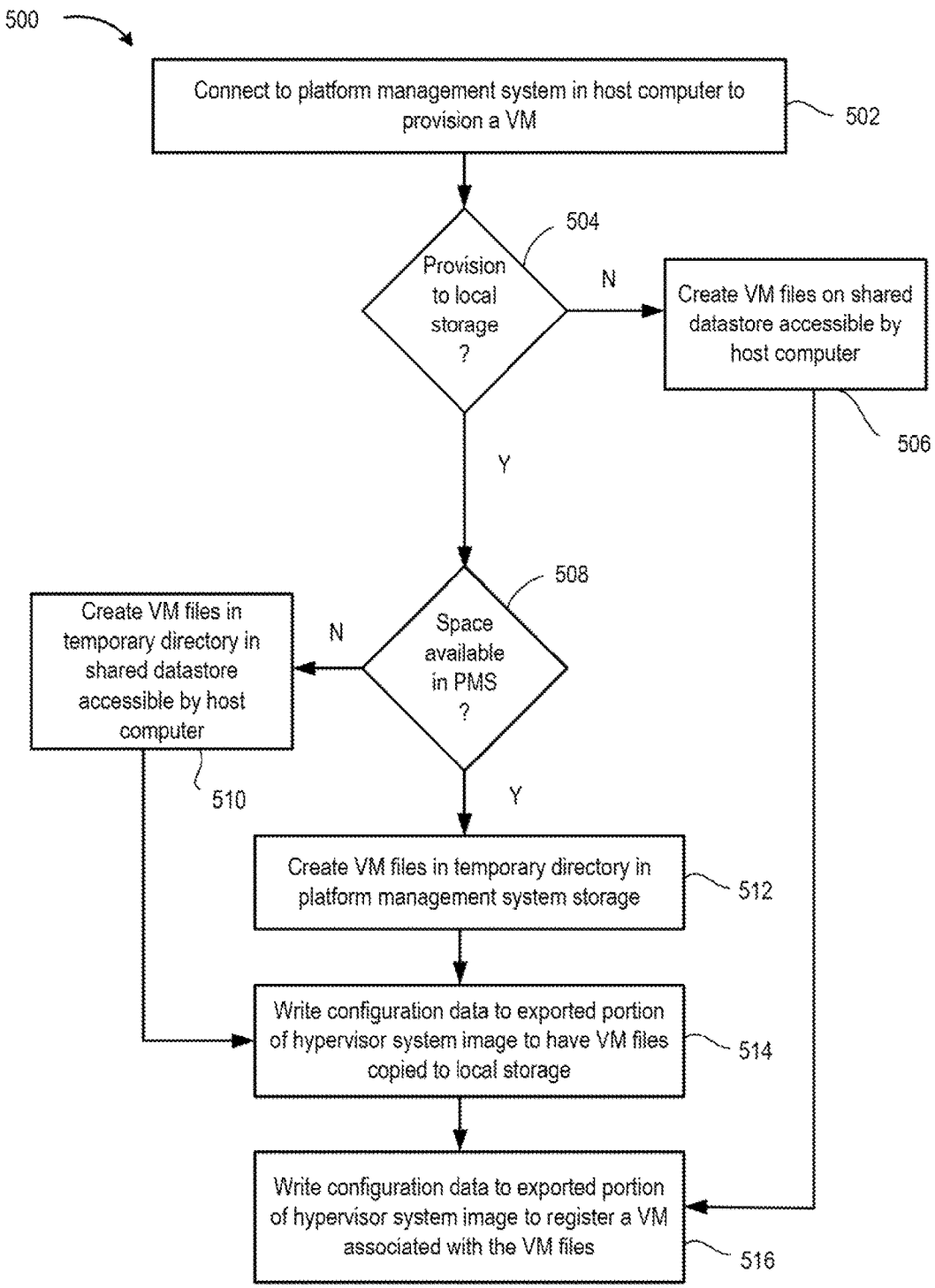
FIG. 5 is a flow diagram depicting a method of provisioning a virtual machine in virtualization software installed on a host computer according to an embodiment.

FIG. 5 is a flow diagram depicting a method 500 of provisioning a VM in virtualization software installed on a host computer according to an embodiment. Provisioning a VM is another example operation that can be performed when accessing the virtualization software through platform management system 212 as discussed above in FIG. 3. Method 500 can be performed by computer system 200 of FIG. 2 and is described with respect computer system 200.

At step 502, client application 236 in client computing system 102 connects to platform management system 212 in host computer 162 to provision a VM in hypervisor 226. Provisioning a VM includes, for example, creating a new VM or cloning an existing VM 228. As described above, client application 236 can negotiate with distributed file system service 232 to gain access to platform management system 212. Alternatively, client application 236 can negotiate with some other service or module of system management software 230 to connect to platform management system 212. In an embodiment, host computer 162 is in a low-power state when client application 236 connects to platform management system 212 (e.g., hypervisor 226 is not executing.

At step 504, client application 236 determines whether the VM is being provisioned to storage 210 in system hardware 203 of host computer 162 (e.g., local storage on host computer 162). If not, method 500 proceeds to step 506, where client application 236 creates VM files (e.g., VM configuration file, virtual disk file(s), etc.) on a shared datastore accessible by host computer 162. For example, client application 236 can create VM files for a VM in a datastore 234 on SAN 164. The method 500 proceeds from step 506 to step 516, where client application 236 writes configuration data to an exported portion of hypervisor system image 224 to register a VM associated with the new VM files with hypervisor 226. For example, client application 236 can modify a VM inventory in the configuration state stored within hypervisor system image 224.

If at step 504 client application 236 determines that the VM is not being provisioned to storage 210 in system hardware 203, method 500 proceeds to step 508. At step 508, client application 236 determines whether there is space available on storage 222 in platform management system 212 ("PMS") for the new VM files. If not, method 500 proceeds to step 510, where client, application 236 creates VM files in a temporary directory in a shared datastore accessible by host computer 162 (e.g., datastore 234 in SAN 164). Method 500 proceeds to step 514, where client application 236 writes configuration data to an exported portion of hypervisor system image 224 to have the VM files copied to storage 210. For example, client application 236 can create a script or the like that will be executed by hypervisor 226 during the boot sequence or after the boot sequence has completed to move the VM files to storage 210 in system hardware 203.

If at step 508 client, application 236 determines there is sufficient space on storage 222 in platform management system 212 for the new VM files, then method 500 proceeds to step 512. At step 512, client application 236 creates VM files in a temporary directory on an exported logical storage unit of storage 222. Method 500 proceeds from step 512 to step 514 discussed above. Method 500 proceeds from step 514 to step 516 discussed above.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configuration. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of managing virtualization software installed on a host computer including a hardware platform and a platform management system, comprising:
   connecting to the platform management system in the host computer while the hardware platform in the host computer is in a low-power state;
   accessing files of the virtualization software on a storage device in the platform management system through a distributed file system service executing on a controller of the platform management system, while the virtualization software is not executing; and
   performing and operation on the virtualization software through the distributed file system service executing on the controller of the platform management system,
   wherein performing the operation comprises:
      creating virtual machine files on a datastore stored on a storage system accessible by the host computer and writing configuration data to the storage device in the platform management system to register a virtual machine specified by the virtual machine files with the virtualization software,
      creating the virtual machine files in a temporary directory on the datastore stored on the storage system accessible by the virtualization software and writing the configuration data to the storage device in the platform management system to have the virtual machine files copied to the storage device in the hardware platform of the host computer, or
      creating the virtual machine files in the temporary directory on the storage device in the platform management system and writing the configuration data to the storage device in the platform management system to have the virtual machine files copied to the storage device in the hardware platform of the host computer.

2. The method of claim 1, wherein the step of connecting comprises:
remotely accessing the platform management system through a network interface from a client computing device.

3. The method of claim 1, wherein the distributed file system service comprises a network file system (NFS) service that exports at least one logical storage unit on the storage device having the files.

4. The method of claim 1, wherein the files include at least one of configuration files or installation files in a hypervisor system image.

5. The method of claim 1, wherein the files include at least one virtual machine configuration file.

6. The method of claim 1, wherein performing the operation comprises
writing the configuration data to the storage device in the platform management system to configure the virtualization software, a virtual machine managed by the virtualization software, or both.

7. A computer system, comprising:
a hardware platform including a central processing unit (CPU); and
a platform management system including a controller and a storage device, the storage device storing virtualization software having code that, when executed by the CPU, virtualizes the hardware platform, wherein the controller is configured to;
execute a distributed file system service to provide access to files of the virtualization software, while the virtualization software is not executing; and
perform an operation on the virtualization software through the distributed file system service executing on the controller of the platform management system,
wherein the controller is further configured to:
create virtual machine files on a datastore stored on a storage system accessible by the host computer and write configuration data to the storage device in the platform management system to register a virtual machine specified by the virtual machine files with the virtualization software,
create the virtual machine files in a temporary directory on the datastore stored on the storage system accessible by the virtualization software and write the configuration data to the storage device in the platform management system to have the virtual machine files copied to the storage device in the hardware platform of the host computer, or
create the virtual machine files in the temporary directory on the storage device in the platform management system and write the configuration data to the storage device in the platform management system to have the virtual machine files copied to the storage device in the hardware platform of the host computer.

8. The computer system of claim 7, wherein the distributed file system service comprises a network file system (NFS) service that exports at least one logical storage unit on the storage device having the files.

9. The computer system of claim 8, wherein the files have the configuration data for virtualization software, a virtual machine managed by the virtualization software, or both.

10. The computer system of claim 8, wherein the files include installation data for the virtualization software.

11. A non-transitory computer readable medium comprising instructions when executed in a computer system, causes the computer system to carry out a method of managing virtualization software installed on a host computer including a hardware platform and a platform management system, comprising:
connecting to the platform management system in the host computer while the hardware platform in the host computer is in a low-power state; and
accessing files of the virtualization software on a storage device in the platform management system through a distributed file system service executing on a controller of the platform management system, while the virtualization software is not executing; and
performing an operation on the virtualization software through the distributed file system service executing on the controller of the platform management system,
wherein performing the operation comprises:
creating virtual machine files on a datastore stored on a storage system accessible by the host computer and writing configuration data to the storage device in the platform management system to register a virtual machine specified by the virtual machine files with the virtualization software,
creating the virtual machine files in a temporary directory on the datastore stored on the storage system accessible by the virtualization software and writing the configuration data to the storage device in the platform management system to have the virtual machine files copied to the storage device in the hardware platform of the host computer, or
creating the virtual machine files in the temporary directory on the storage device in the platform management system and writing the configuration data to the storage device in the platform management system to have the virtual machine files copied to the storage device in the hardware platform of the host computer.

12. The non-transitory computer readable medium of claim 11, wherein the step of connecting comprises:
remotely accessing the platform management system through a network interface from a client computing device.

13. The non-transitory computer readable medium of claim 11, wherein the distributed file system service comprises a network file system (NFS) service that exports at least one logical storage unit on the storage device having the files.

14. The non-transitory computer readable medium of claim 11, wherein performing the operation comprises:
writing the configuration data to the storage device in the platform management system to configure the virtualization software, a virtual machine managed by the virtualization software, or both.

* * * * *